(12) United States Patent  
Newberg

(10) Patent No.: US 7,571,892 B2  
(45) Date of Patent: Aug. 11, 2009

(54) SANITARY DRAIN VALVE

(75) Inventor: Douglas A. Newberg, Plainsboro, NJ (US)

(73) Assignee: Pharmenta, Inc., Princeton, NJ (US)

( * ) Notice: Subject to any disclaimer, the term of this patent is extended or adjusted under 35 U.S.C. 154(b) by 0 days.

(21) Appl. No.: 11/315,267

(22) Filed: Dec. 23, 2005

(65) Prior Publication Data

US 2006/0151737 A1     Jul. 13, 2006

Related U.S. Application Data

(60) Provisional application No. 60/638,161, filed on Dec. 23, 2004.

(51) Int. Cl.
*F16K 1/00* (2006.01)
*F16K 15/00* (2006.01)

(52) U.S. Cl. ...................................... 251/331; 251/144

(58) Field of Classification Search .................. 251/144, 251/331

See application file for complete search history.

(56) References Cited

U.S. PATENT DOCUMENTS

| | | | |
|---|---|---|---|
| 3,399,695 A | * | 9/1968 | Stehlin ........................ 137/551 |
| 4,917,357 A | | 4/1990 | Danko |
| 5,152,500 A | * | 10/1992 | Hoobyar et al. ............. 251/269 |
| 5,246,204 A | | 9/1993 | Ottung |
| 6,491,283 B2 | | 12/2002 | Newburg |
| 6,601,823 B2 | | 8/2003 | Newburg |

* cited by examiner

*Primary Examiner*—John K Fristoe, Jr.
(74) *Attorney, Agent, or Firm*—Birch, Stewart, Kolasch & Birch, LLP

(57) ABSTRACT

A valve assembly includes a valve body having an internal cavity, an orifice in communication with the internal cavity for communicating with a process in a tank or conduit and an outlet through which process material entering the internal cavity through the orifice can be drained from the internal cavity. A valve actuator body includes an actuating shaft having a sealing tip and is mounted for movement in the valve actuator body to seal and unseal the orifice. A diaphragm is mounted to the sealing tip and includes a base that seals with a bottom wall of the valve body. The bottom of the valve body has an aperture that receives the actuating shaft therethrough. The diaphragm is mountable to and removable from the bottom wall of the valve body through the aperture.

8 Claims, 10 Drawing Sheets

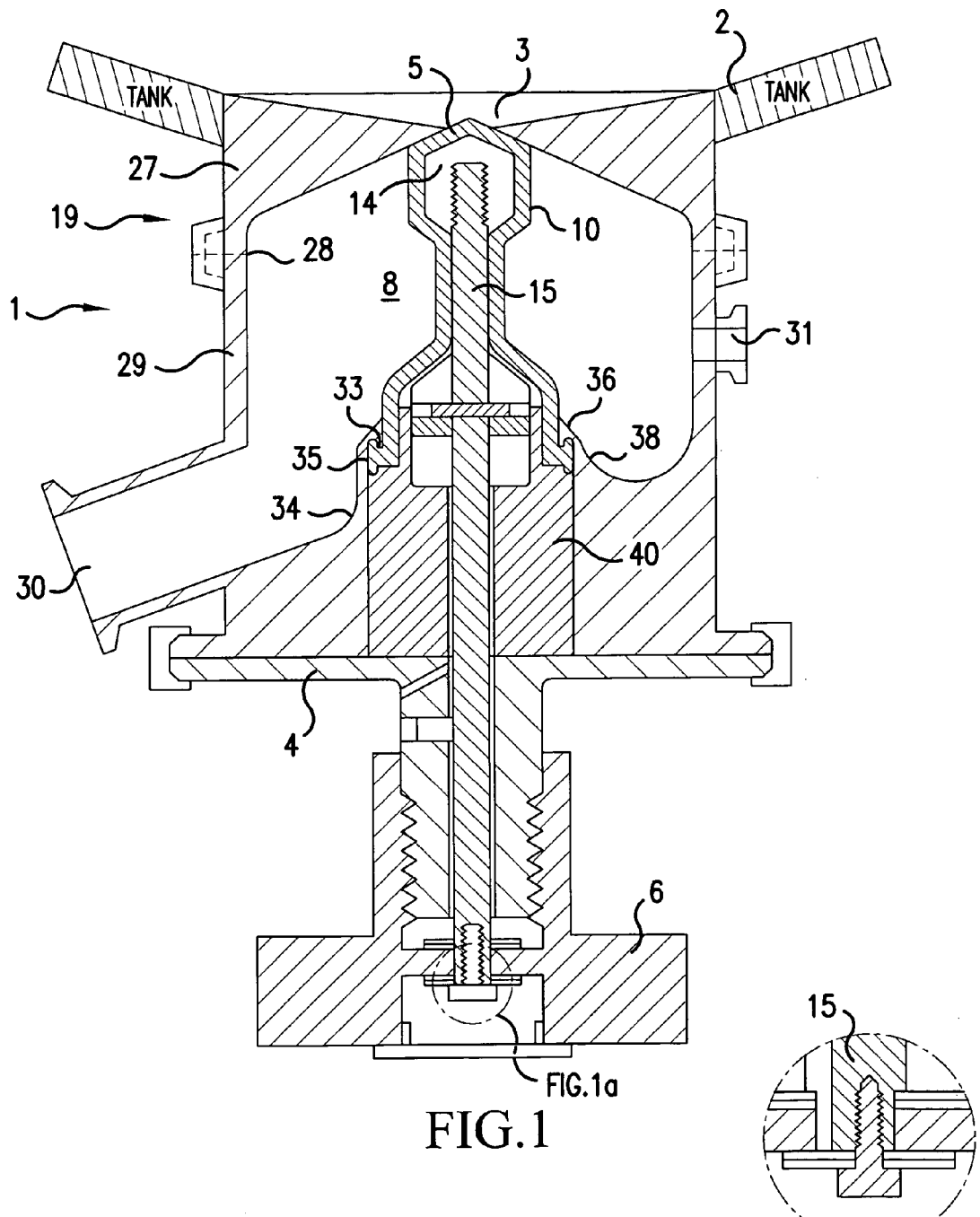
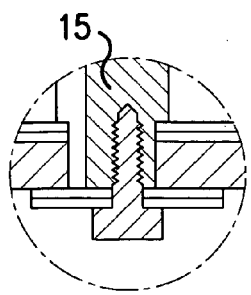
FIG.1
FIG.1a

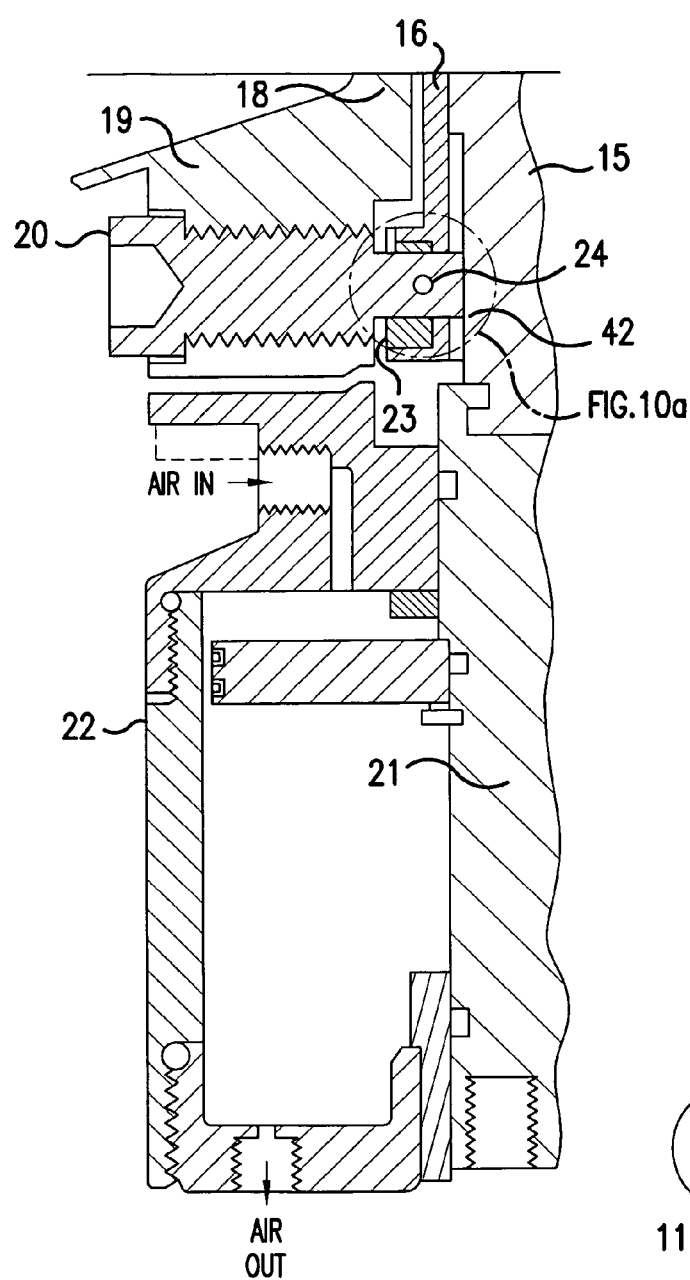
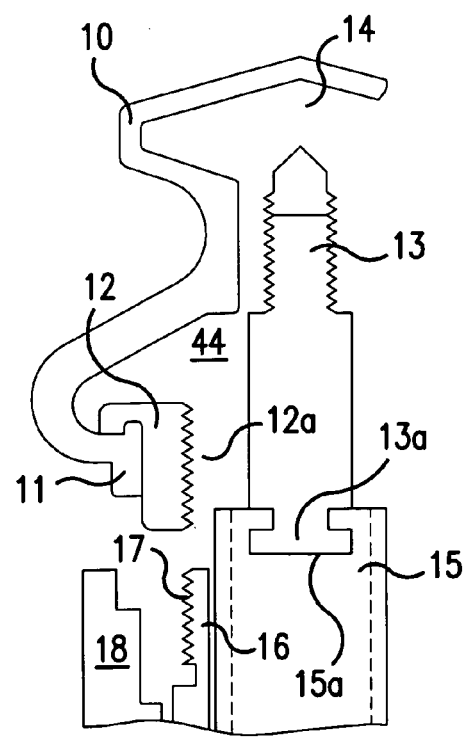
FIG.10
FIG.10a
FIG.11

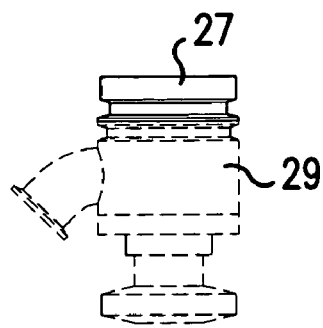
FIG.13a
FIG.13b
FIG.13c
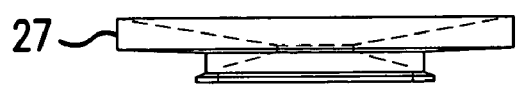
FIG.13d
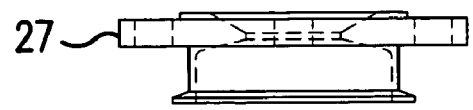
FIG.13e
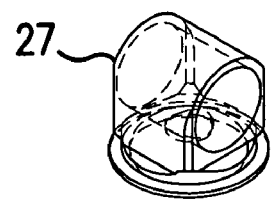
FIG.13f
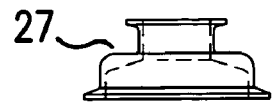
FIG.13g

SANITARY DRAIN VALVE

CROSS-REFERENCE TO RELATED APPLICATIONS

This nonprovisional application claims priority under 35 U.S.C. § 119(e) on U.S. Provisional Application No. 60/638,161, filed on Dec. 23, 2004, the entirety of which is incorporated herein by reference.

BACKGROUND OF INVENTION

1. Field of Invention

The present invention relates to the field of withdrawing material from a tank or conduit. In particular, the invention relates to valves for withdrawing material from tanks or conduits where there is a desire for valves that passively drain with a minimum of material hold-up and/or valves where seal change-out can be performed with minimal valve disassembly. (NOTE: While these valves may be designed as "drain" valves, they can be used with equal effectiveness on the side walls of tanks, in process flow lines as well as many other places in the process.) The invention also relates to the desire for equipment to be user-friendly, both at the outset when it is being installed, as well as when it is in use and, later, when equipment usage needs change. Optimally, equipment would lend itself to adaptation to new uses with minimal effort on the part of the owner or operator.

2. Description of Related Art

Many valves provide a means for draining the contents of a tank or conduit. However, these valves include a seal between the actuating shaft and the valve body that is formed by a flexing diaphragm or a sliding o-ring or packing. The seal formed between the shaft and the valve body is mounted in the bottom wall of the valve body, behind a second non-process side of the bottom wall. The wall thickness between the first process side of the bottom wall and the second non-process side of the wall, where the seal is actually formed with the valve body, creates/results in/forms a low pooling area in the bottom of the valve body that cannot be drained because the valve body bottom wall immediately around the seal is higher then the seal itself. Furthermore, because this seal is formed in the bottom wall of the valve body, seal replacement is carried out on existing drain valve designs by removal of the actuator from its attachment point on the bottom exterior wall of the valve body. Actuator removal for diaphragm replacement also requires that the actuating shaft be removed. While actuator and actuator shaft removal is both time-consuming and expensive, it also requires that an allowance be made for a substantial amount of space about the installation site of the valve so that the shaft and actuator can be removed.

A valve design that minimizes material hold-up while allowing ease of diaphragm change-out is desirable. A seal that is changeable without actuator removal would be of increasing value as valve size increases and subassemblies become bigger and more unwieldy. Diaphragm change-out without actuator removal would also allow the valve-actuator assembly to be mounted with much less distance between the ground and the tank or conduit valve mounting point, also a desirable feature. Furthermore, in some cases where fast delivery and installation of the valve are necessary for speedy delivery of the tank to the end user, a valve body designed in two pieces where the upper valve body attachment flange is simple and quick to fabricate and, consequently, quick to ready for supply to the fabricator of the tank or conduit, is also desirable. Lastly, it would also be desirable if the overall valve design would allow a given upper valve body to be fit with a variety of configurations of lower valve body and actuator and, in a similar fashion, a given lower valve body and actuator to be mated with a variety of configurations of the upper valve body.

SUMMARY OF THE INVENTION

The present invention is an improvement upon U.S. Pat. Nos. 6,601,823 and 6,491,283 to Newberg, which are hereby incorporated by reference. The various embodiments described in the above patents would also be applicable to the present invention. Accordingly, the various embodiments have not been specifically described herein.

It is the object of the present invention to provide a device, which allows for material to be removed from a process while avoiding the deficiencies of the background art. Specifically, it is the object of the present invention to provide a valve for passively draining material from tanks or conduits while minimizing the amount of material held up in the valve after draining is complete. Furthermore, it is the object of the invention to provide an improved drainability of the valve along with easier diaphragm replacement, without the need for disassembly of the valve body or valve body-actuator assembly and, all of the above while allowing for valve installation and maintenance with minimal ground clearance. It is also the object of this invention to provide a design that is flexible and can be fabricated as a 2-part valve body without sacrificing its complete passive drainability. The 2-part design, with a sanitary seal between the two halves positioned above the drain outlet, allows the supply of either part of the valve body early and expeditiously so as not to hold up other equipment fabrication and installation activities even though they might be located at different sites. Furthermore, whereas today's radial diaphragm tank bottom valve body designs are all made as one piece, requiring the valve body to be present for all steps of its fabrication, this invention's 2-part valve body allows the parts to be fabricated, tested, shipped and stocked separately and does not require them to be brought together until time of use. This design approach also allows for the mating of a variety of top halves with a variety of bottom halves, a range of versatility not available today where sanitary valve bodies are fabricated as one-piece units with elements arranged in specific orientations and dedicated for use in specific applications.

An embodiment of the present invention is directed to a two-part valve body wherein the tank- or conduit-attachment flange forms an upper portion of the valve and includes the orifice for communicating with the process in the tank or conduit, the annular sealing surface about the orifice, a first connection to the tank or conduit and a second connection to the lower portion of the valve body. The lower portion of the valve body includes a bottom of the internal cavity in the valve body and an outlet from the valve body through which the material entering the valve body through the orifice in the upper portion of the valve body may be drained from the internal cavity of the assembled valve body.

An embodiment of the present invention is also directed to a diaphragm valve where the stationary perimeter (fixed, mounting) seal formed between the diaphragm and the valve body can be formed in one of several ways so designed to minimize hold-up of material draining through the valve body while allowing the diaphragm to be mounted into the valve up through the bottom wall of the valve body and/or allowing the diaphragm to be mounted into the valve from a position above the bottom wall of the valve body. The valve includes a valve body with a seal formed between some portion of the valve body bottom wall with a first process side of the diaphragm which may also include:

variations in the manner and orientation in which the diaphragm and the pedestal mate;

a bottom mounting diaphragm with expanding flange seal face; and a diaphragm mounting combination that includes a bushing.

The present invention is also directed to a valve assembly, comprising:

a valve body, said valve body including an internal cavity, an orifice in communication with the internal cavity for communicating with a process in a tank or conduit and an outlet through which process material entering the internal cavity through the orifice can be drained from the internal cavity;

a valve actuator body including an actuating shaft, said actuating shaft including a sealing tip and being mounted for movement in the valve actuator body to seal and unseal the orifice; and a diaphragm, said diaphragm being mounted to the sealing tip and including a base that seals with a bottom wall of the valve body, wherein the bottom of the valve body has an aperture that receives the actuating shaft therethrough, said diaphragm being mountable to and removable from the bottom wall of the valve body through the aperture.

The present invention is also directed to a valve body having an access to the internal cavity of the valve body through the sidewall of the valve body such that the access port is large enough for the internally-mounting diaphragm to be removed and reinstalled through the valve body sidewall and without necessitating the breakdown of the valve body into upper and lower valve body subassemblies.

The present invention is also directed to a valve body, wherein replacement of the diaphragm can be performed without disassembly of the valve body into two parts and which would also not require the removal of the actuator from the valve body, thus simplifying valve maintenance and allowing for valve body-actuator installations with minimal clearance between the bottom of the actuator and the floor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a cross-section of a valve according to an embodiment of the present invention;

FIG. 10 is a cross-section of a portion of a valve according to the present invention, wherein an arrangement of a diaphragm retainer bolt is illustrated in detail;

FIG. 11 is cross-section of a portion of a valve according to the present invention, wherein one way of assembling the diaphragm onto the actuating shaft is illustrated in detail;

FIGS. 13a to 13g and FIGS. 14a to 14j are side views of a plurality of different valve body top halves that cooperate with a plurality of different valve body bottom halves.

DETAILED DESCRIPTION OF THE PREFERRED EMBODIMENTS

Figure 2:
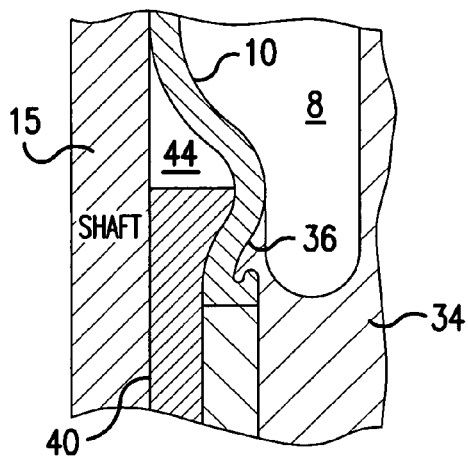
FIG. 2 is a cross-section of a portion of the valve of FIG. 1, wherein a variation of the perimeter sealing element is illustrated.

The present invention will now be described with reference to the accompanying drawings, wherein the same reference numerals will be used to identify the same or similar elements throughout the several views.

FIG. 1 illustrates a valve body 19 that may be fabricated in two halves 27, 29 with a joint 28 between the two halves (shown here in dotted lines). The half 27 is mountable to a tank or conduit 2 by welding or other means that would be well known to one having ordinary skill in the art. The half 27 also includes an orifice 3, through which a process within the tank or conduit 2 is sealed by a sealing tip 5.

Figure 9:
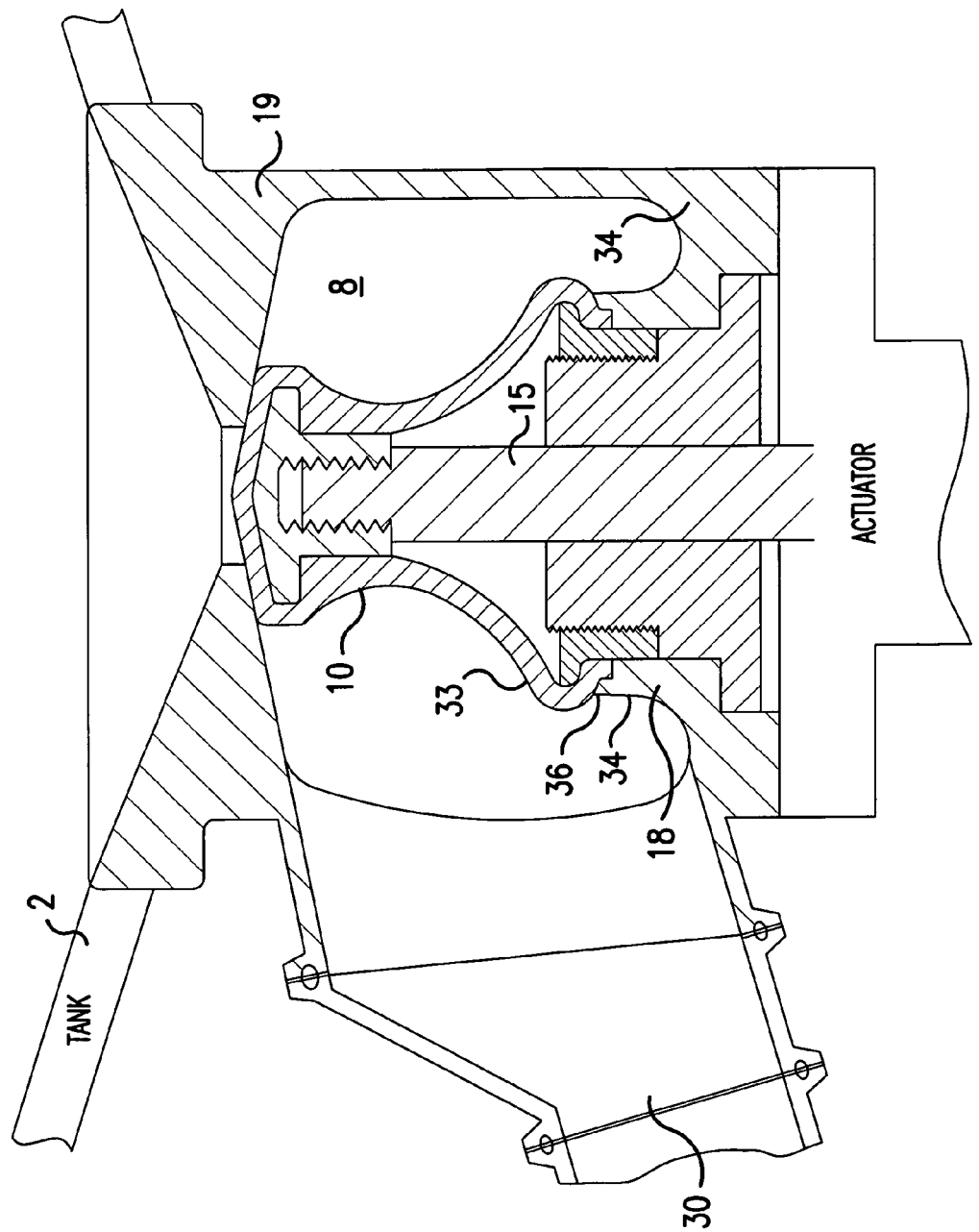
FIG. 9 is a cross-section of a valve according to another embodiment of the present invention.

The joint 28, if present, is located above the valve body outlet 30 and may also be located above a secondary inlet port 31 to the valve body 19 generally used for the supply of CIP or SIP solutions to the valve body 19. The valve 1 may have an o-ring or packing forming a seal (not shown) between the valve body 19 and the valve actuator shaft 15, isolating the process in the valve body 19 from the mechanical elements of the valve 1 that move the actuator shaft 15. The valve 1 could be a diaphragm valve in which case the valve 1 would have a diaphragm 10 with a stationary perimeter seal formed between a process side surface 33 of the diaphragm 10 and a non-process side surface 35 of the bottom wall 34 of the valve body 19 as shown in FIG. 1. Alternatively, the process side surface 33 of the diaphragm 10 could be mounted mating with a process side surface 36 of the bottom wall 34, as is illustrated in FIG. 9. With regard to FIG. 1, the process side surface 36 of the bottom wall 34 is sloped to encourage complete, passive drainage to the outlet 30 of material from within the internal cavity 8. While not required, FIG. 1 also illustrates the diaphragm 10 mounted in a pedestal 18 that rises up from the surrounding bottom wall 34, the process side surface 36 of the pedestal 18 (bottom wall 34) having a sloping surface to enhance the passive drainage of the internal cavity 8.

In the detail A of FIG. 1, the arrangement of the connection between the hand wheel 6 and actuator shaft 15 are illustrated.

FIG. 2 illustrates a variation of the arrangement of the perimeter sealing elements of the diaphragm 10 and the valve body 19 wherein the process side surface 36 of the bottom wall 34 is tapered, its taper roughly matched by that of a bushing 40 that fits within the lower diaphragm void 44, the lateral walls of the diaphragm 10 being captured between the two surfaces as the bushing 40 is retracted, the compression of the diaphragm wall forming an improved seal to the process with the pedestal 18.

Figure 3:
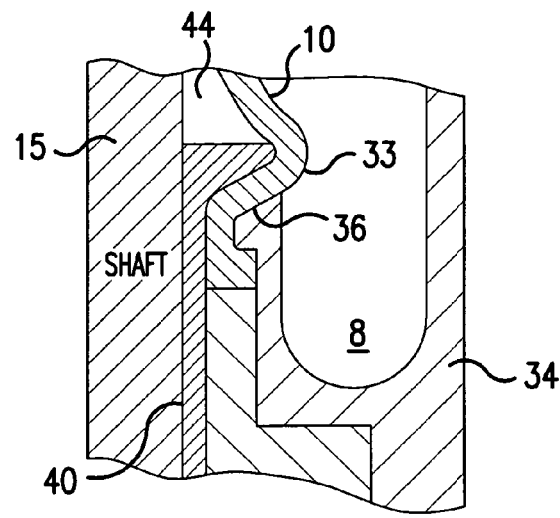
FIG. 3 is a cross-section of a portion of the valve of FIG. 1, wherein a variation of the perimeter sealing element is illustrated.
Figure 4:
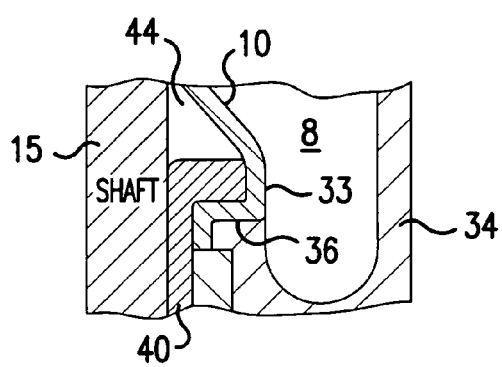
FIG. 4 is a cross-section of a portion of the valve of FIG. 1, wherein a variation of the perimeter sealing element is illustrated.
Figure 5:
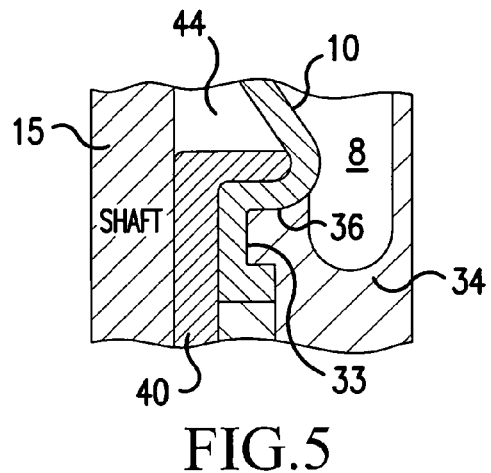
FIG. 5 is a cross-section of a portion of the valve of FIG. 1, wherein a variation of the perimeter sealing element is illustrated.

FIGS. 3, 4 and 5 illustrate the base of the diaphragm captured between the lower surface of a bushing 40 housed inside the void 44 of the diaphragm 10 and a surface of the bottom wall 34 of the valve body 19, wherein the bottom wall has an upward-facing component that forms a seal with the process side surface 33 of the diaphragm 10 (meaning anything from near vertical but opening inward and upward to horizontal to facing vertically outward).

With specific regard to FIGS. 4 and 5, the process side surface 33 of the diaphragm 10 forms a smooth transition with the outer wall of the pedestal 18 upon which the diaphragm 10 is mounted. This minimizes shielded or quiet zones that might be difficult to clean-in-place.

Figure 6:
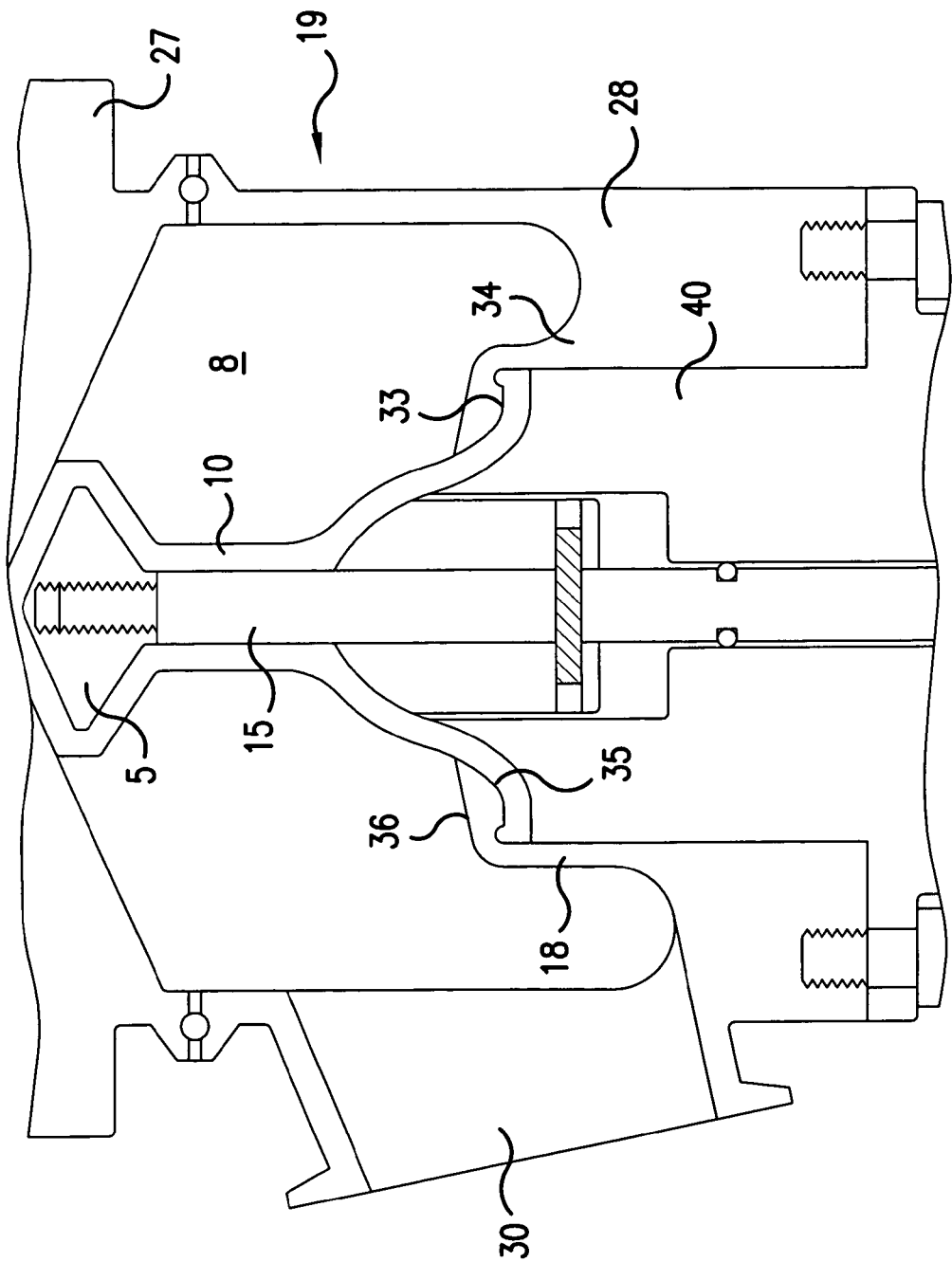
FIG. 6 is cross-section of a valve according to another embodiment of the present invention.

FIG. 6 illustrates a valve very similar to that shown in FIG. 1 except that FIG. 6 illustrates a diaphragm 10 mounted from the bottom up into a bottom wall 34 of the valve body 19 where the diaphragm seal seat is a fructo-conical mating surface of the process side surface 33 of the diaphragm 10 and a non-process side surface 35 of the pedestal 18 (bottom wall 34). FIG. 6 illustrates the concept of a frusto-conical process side surface 36 of the pedestal 18, designed to enhance full passive internal cavity 8 drainability. FIG. 6 further illustrates how this feature can be combined with a diaphragm/valve body bottom wall arrangement that can allow the diaphragm 10 to be easily mounted into the valve body bottom wall 34 from below. This can be accomplished, since the through-bore in the bottom wall 34 is large enough to accommodate passage of the sealing tip 5 of the diaphragm 10.

Figure 7:
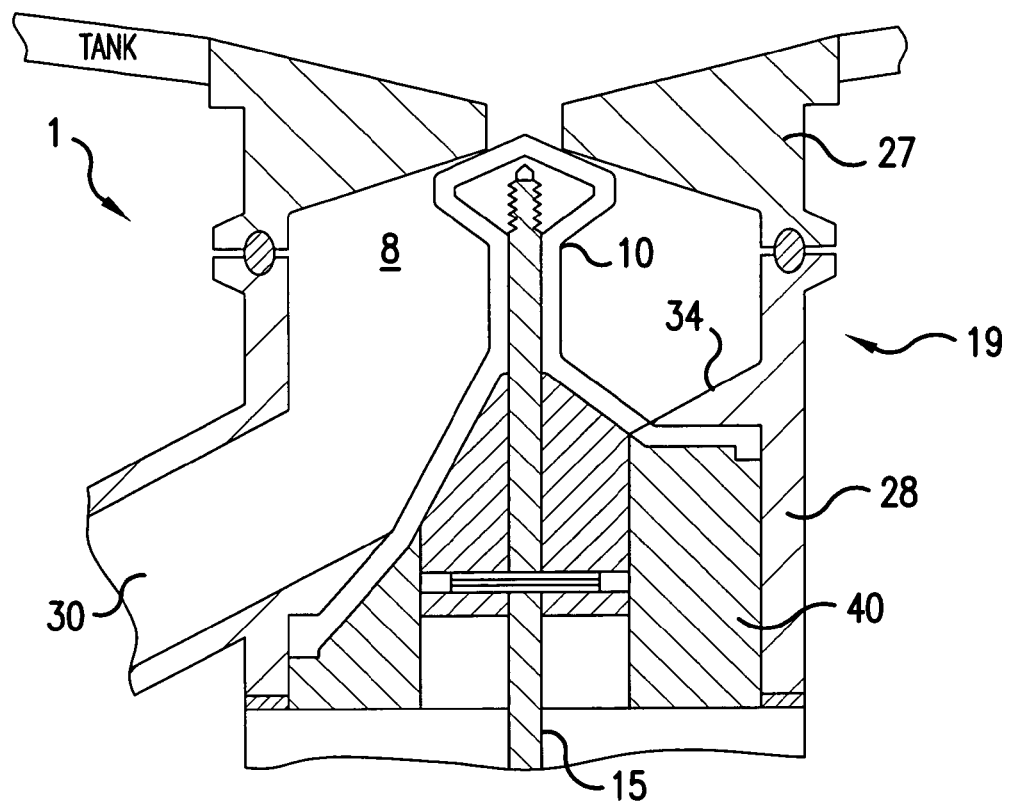
FIG. 7 is a cross-section of a valve according to another embodiment of the present invention.
Figure 8:
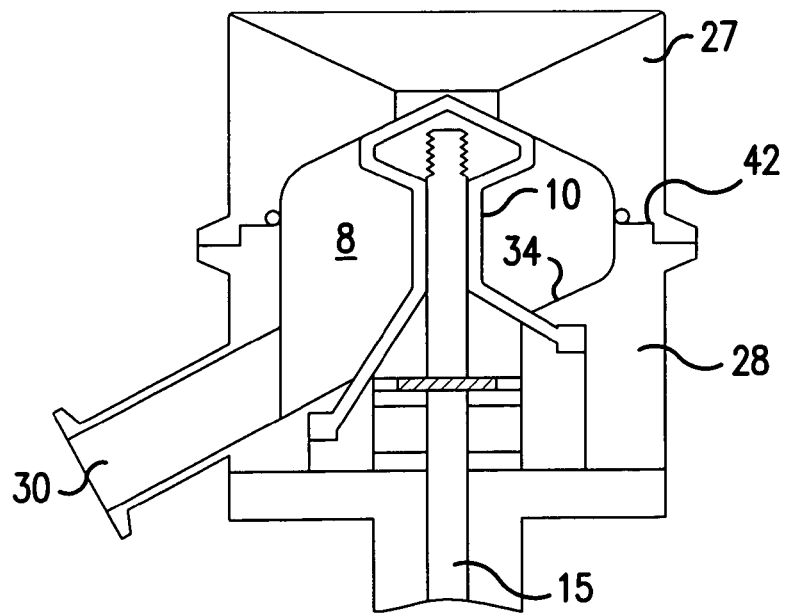
FIG. 8 is a cross-section of a valve of FIG. 7, wherein indexing alignment shoulders are formed in the joint between the two halves of the valve body.

FIGS. 7 and 8 illustrate how a diaphragm 10 might be formed asymmetrically for mounting into the sloping bottom wall 34 of a valve body 19 so that passive drainability of the valve 1 can be achieved without the use of a pedestal formed in the bottom wall 34 of the valve body 19. FIG. 8 has the added indexing alignment shoulders 42 formed in the joint between the two halves 27, 28 of the valve body 19 at the mating flanges.

FIG. 9 illustrates a valve body 19 with an oversized outlet 30. The oversized outlet 30 provides several benefits. First, it allows the diaphragm 10 to be installed or removed through the outlet 30 when the double-flanged reducer fitting is removed. Second, the replacement of a diaphragm through the side wall of the valve body 19 might not require the valve 1 to be removed from the tank or conduit 2 for the replacement to take place. Also, this arrangement does not require the actuator shaft 15 to be removed. The valve 1 could, in fact, be welded into the tank or conduit 2, even though the valve body 19 is formed in a single piece (as compared with the valve body 19 of previous embodiments where the valve body 19 is formed in two halves 27, 29). Furthermore, not having to remove the actuator shaft 15 or the valve body 19 during diaphragm 10 replacement means the valve 1 might not require as much clearance with adjacent equipment for it to be installed, maintained and operated. Lastly, the oversized opening 30 in the sidewall of the valve body 19 will straighten tortuous flow paths through the valve body 19, increasing flow rates through the valve 1.

It should be noted that the pedestal 18 concept (illustrated in FIG. 9 and in other figures in this disclosure) offers the benefit of allowing a valve body 19 to be modified, particularly shortened or elongated without requiring the diaphragm 10 to be changed. For instance, the upper portion or neck of the valve body 19, between the attachment flange and the outlet 30, can be lengthened so as, for instance, to allow a second attachment to be made with the tank along the valve body 19. Such a construction might be desirable if the valve body 19 was going to be incorporated into a jacket on a vessel. By extending (lengthening) the pedestal 18, the same diaphragm can be used.

While FIG. 9 has been illustrated as being used in a valve 1 having a one-piece valve body 19, it should be understood that the embodiment of FIG. 9 could be used in a two-piece valve body. In addition, while FIG. 9 illustrates the use of a pedestal 18, it should be understood that the embodiment of FIG. 9 could be used in a non-pedestal arrangement such as that illustrated in FIG. 10. It should also be understood that the various aspects of each of the embodiments described herein could be used with any of the other features described in the various embodiments of the present invention.

FIG. 10 illustrates one manner in which a diaphragm retainer nut 12 can be retracted, securing the diaphragm base seal with the top of the valve body pedestal 18 while, at the same time, the actuator shaft 15 can be made anti-rotational all without disassembling the actuator shaft 15 from the valve body 19. This is accomplished by rotating a bolt/asymmetrical cam combination. In this design that also accomplishes actuator shaft anti-rotation features, rotation of a bolt 20 in the mating threads in the valve body 19 extends the tip of the bolt 20 up against a flat surface 42 on the side of the actuator shaft 15, limiting the actuator shaft's ability to rotate. Rotation of the bolt 20 causes the attached asymmetrical cam 23 to retract the diaphragm retainer nut 12, securing the diaphragm base to the top of the pedestal 18.

FIG. 10 illustrates a bolt 20 mated with threads in the sidewall of the valve body 19. The bolt 20 has a cam 23 mounted asymmetrically along its shaft. The bolt 20 terminates in a flat surface that can serve as an anti-rotation member when brought into close cooperation with a flat surface 42 on the side of the actuator shaft 15. By rotating the bolt 20 some amount (180 degrees, for instance), the bolt tip flat can be moved into close proximity of the actuator shaft 15 to keep it from rotating. Simultaneously, rotation of the bolt 20 causes the asymmetric cam 23 mounted to it to force the shoulders 25, 26 of the retainer bolt 16 down, causing the attached upper threaded diaphragm retainer nut 12 to compress the base of the diaphragm 10 against the top of the pedestal 18, creating a good seal.

A more detailed description of how the diaphragm 10 can be removed and installed as shown in FIGS. 10 and 11 will now be provided. In FIG. 11, diaphragm 10 includes an insert 14. A short shaft 13 can be installed in this insert 14 (here shown installed using threads). The diaphragm 10 also has installed in its void 44 a retainer nut 12. With actuator shaft 15 extended, the cap 13a at the bottom of short shaft 13 can be mated to the slot 15a on the top of actuator shaft 15. Actuator shaft 15 can then be partially retracted (this may or may not be necessary, depending on the flexibility of the diaphragm) so that the female threads 12a of retainer ring 12 can be threaded onto the male threads 17 of retainer bolt 16. It may be possible, especially with smaller valves, to hand-tighten the retainer ring 12 onto the retainer bolt 16 sufficiently to create a reliable seal between the first side of the diaphragm 10 and the upper surface of the bottom wall (in this case, the top of the pedestal 18) of the valve body 19 against the process. It is likely, however, for large valves that additional mechanical advantage may be necessary to assure sufficient compressive force is applied on the diaphragm base 11 to form an effective seal with the pedestal 18. One such example of a mechanism for achieving the compressive force is illustrated in FIG. 10. It is merely illustrative of one of many ways this could be achieved that would be obvious to one knowledgeable in the art. FIG. 10 illustrates a portion of the bottom of the left half of a valve body 19 and of the left half of a pneumatic actuator assembly 22 partially but not completely attached to the bottom of the valve body 19. The pneumatic actuator assembly 22 is used to automatically drive the actuator shaft 15 up and down within the valve body 19.

With the diaphragm 10 installed by finger-tightening as described above (whether or not the actuator assembly 22 is attached), the base 11 of the diaphragm 10 can be compressed against the top of the pedestal 18 by rotating bolt 20 mounted in the sidewall of valve body 19. Bolt 20 has attached to it an asymmetric cam 23 (shown attached to the bolt by a pin 24). The end of bolt 20 with cam 23 is positioned between two shoulders 25 (upper) and 26 (lower) of retainer bolt 16 (see detail A in FIG. 10). By rotating bolt 20 by 180 degrees, the cam 23 can be made to move from pushing retainer bolt 16 (and attached retainer ring 12) up (so that the diaphragm 10 can be removed) to pulling retainer bolt 16 down, capturing the diaphragm 10, creating the seal.

FIG. 11 illustrates one means by which the diaphragm 10 might be assembled onto the actuating shaft 15 and securely sealed onto the top of the pedestal 18 to form an effective seal with the process. In FIG. 11, a short actuator shaft 13 is first mounted into the diaphragm tip insert 14. The cap 13*a* on the bottom of this insert 14 is slipped into the slot 15*a* on the extended actuator shaft 15. The actuator shaft 15 can then be partially retracted and the female threads in the top of the diaphragm retainer nut 12 can then be threaded onto the top of the male threads of the retainer bolt 16. The retainer bolt 16 can then be retracted as illustrated in FIG. 10 and described above.

Figure 12:
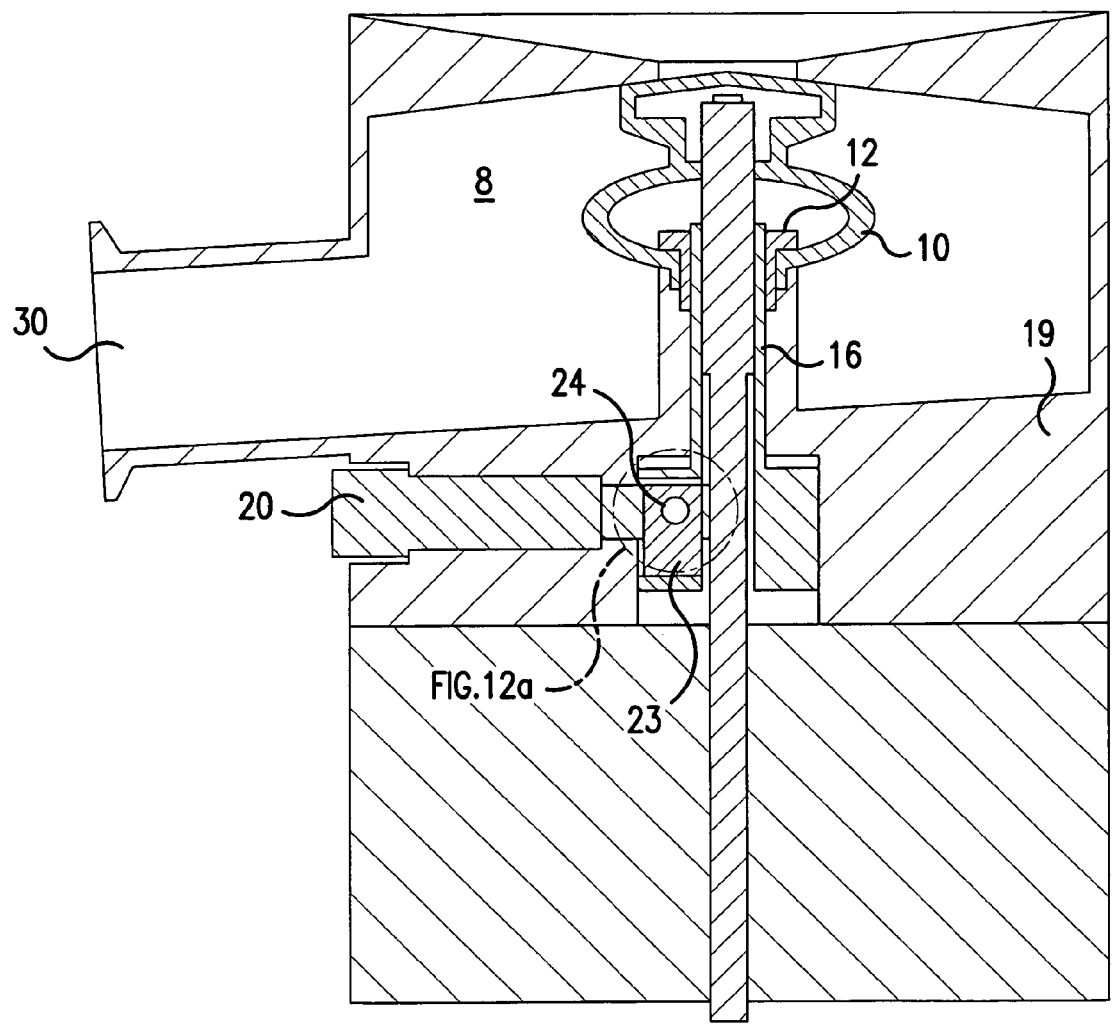
FIG. 12 is a cross section of a valve according to another embodiment of the present invention.
Figure 12A:
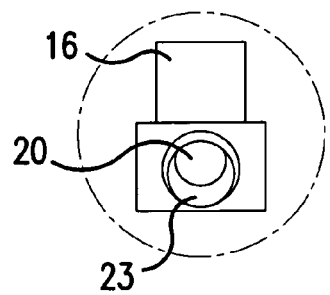
Figure 14A:
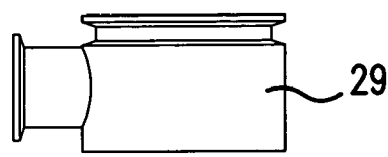
Figure 14B:
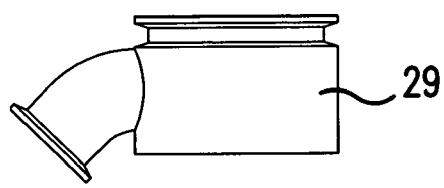
Figure 14C:
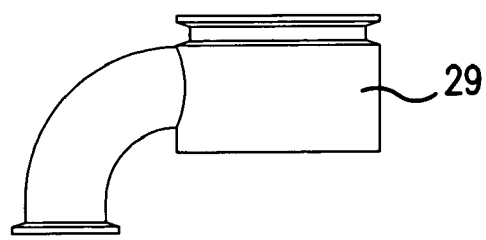
Figure 14D:
Figure 14E:
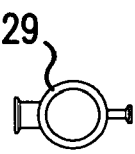
Figure 14F:
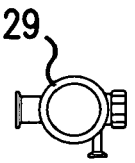
Figure 14G:
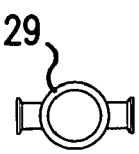
Figure 14H:
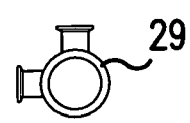
Figure 14I:
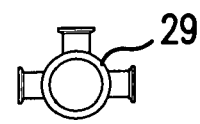
Figure 14J:
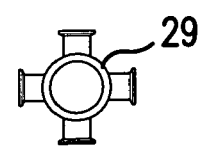

FIG. 12 is a cross-section through an alternative embodiment of a combination of FIGS. 10 and 11, wherein a detail of the retainer bolt 16 for loosening the diaphragm 10 seal is included. Specifically, the retainer bolt 16 includes a generally circular aperture, rather than the upper lower shoulders 25, 26 illustrated in FIG. 10.

FIGS. 13*a*-13*g* illustrate examples of upper valve body halves 27 that can be configured with a single valve bottom half 29 with actuator. FIG. 13*a* illustrates the valve bottom half 29 with a standard weld-on flange upper half 27 in position (but not attached, i.e. shown without a sanitary clamp) on valve bottom half 29 with actuator. FIG. 13*b* illustrates the same standard weld-on flange upper half 27 as FIG. 13*a*, except that it is illustrated separate from the bottom half 29. FIG. 13*c* is tall- or double-weld flange upper half 27, designed for use with jacketed or insulated tanks 2. This flange also includes a shallow conical upper surface. FIG. 13*d* is a wide weld flange upper half 27 in combination with a shallow cone. Wide flanges protect the sealing face about the orifice from distortion during welding while the shallow conical upper face is open to the agitated process in the tank 2, improving mixing right down to the flange orifice. FIG. 13*e* is a flange upper half 27 that allows the valve to be mated with a pre-installed mating bolt flange. FIG. 13*f* is a "T" pipe section flange upper half 27, which would allow draining from a pipe. FIG. 13*g* is a flange upper half 27 with a sanitary flange connection for mating with another sanitary flange installed in a tank or pipe (conduit 2).

As can be understood from FIGS. 13*a* to 13*g*, the upper half 27 can be in many different forms and can all mate with the same lower half 29. In addition, each of the lower halves 29 can take a different form and can mate with each of the plurality of different upper halves 27. It should also be understood that the specific upper and lower halves 27, 29 illustrated in the figures are not exhaustive, but have merely been provided to explain that the two part valve body 19 of the present invention provides the ability to tailor many different upper halves 27 that may have been attached to a tank at a previous time to with many different types of lower halves 29.

FIGS. 14*a* to 14*j* illustrates examples of the various possible inlet and outlet arrangements that could be made in both the upper and lower valve body halves 27, 29.

Figure 15:
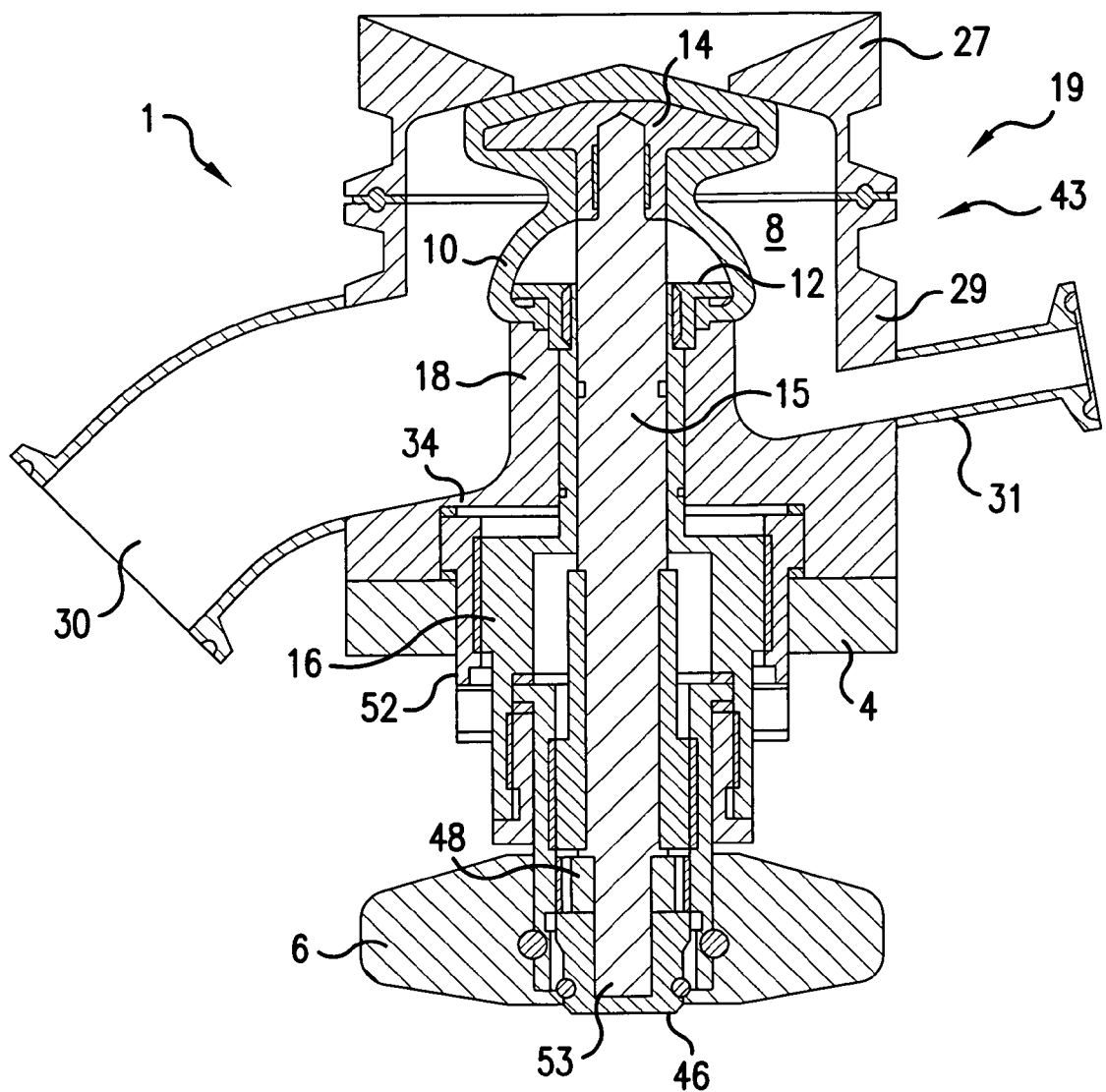
FIG. 15 is a cross-section of a valve according to another embodiment of the present invention.

FIG. 15 illustrates another embodiment of an actuator shaft 15 that allows the operator to change a diaphragm 10 without removing the actuator shaft 15 from the valve body 19.

Referring to FIG. 15, the steps that are used to remove the diaphragm 10 from the valve 1 will be described. It should first be noted that the valve 1 could be completely mounted to the tank or conduit 2 to remove the diaphragm 10 from the valve 1 in the situation where an oversized outlet 30, such as the outlet 30 of FIG. 9 is used. In this case, the diaphragm is simply removed through the oversized outlet 30. Alternatively, if a smaller outlet 30 is used, as shown in FIG. 15, then the sanitary clamp can be removed to detach the half 27 from the half 29 of the valve body 19. In this case, the diaphragm is simply removed directly out of the internal cavity. Of course, if both an oversized outlet 30 and a two-part valve is provided in a single embodiment, then the diaphragm can be removed through the oversized outlet without removing the valve 1 from the tank or conduit 2 or the diaphragm 10 can be removed by detaching the halves 27 and 29.

First, the hand wheel 6 is rotated counter-clockwise to open the valve about half way. This releases the pressure on the diaphragm 10, so that the diaphragm can be removed. The indicator cap 46 is removed to gain access to the nut 48 and the hexagonal end 50 of the actuator shaft 15. Second, the nut 48 is rotated counter-clockwise to loosen the actuator shaft 15. The nut 48 does not have to be removed completely. It is sufficient that the nut 48 be loosened only enough to provide clearance so that the actuator shaft 15 can be rotated freely. Third, the hexagonal end 50 of the actuator shaft 15 is rotated counter-clockwise to unthread the actuator shaft 15 from the insert 14. Fourth, the retainer sleeve 52 is rotated counter-clockwise to raise the retainer bolt 16 to thereby raise the retainer nut 12 and base 11 of the diaphragm 10. This action releases the seal between the diaphragm base 11 and the pedestal 18 or the bottom wall 34. The retainer bolt 16 includes an anti-rotation mechanism (not shown) that prevents rotation but allows axial sliding of the retainer bolt 16. Fifth and finally, the diaphragm 10 can be removed directly out of the internal cavity (in the situation where a two-part valve is used) or out of the outlet 10 (in the situation where an oversized outlet is used). The installation of a new diaphragm 10 is performed in the reverse of the removal.

The many advantages that different embodiments of the present invention provide will now be summarized below.

Existing drain valves, whether including diaphragm seals or either o-ring and packing-style seals, all include seals positioned in the bottom wall of the valve body, at the lowest point in the valve. The outlet for material draining from the internal cavity of the valve body, on the other hand, is through the side wall of the valve at a position above the position of the valve seals. Consequently, when the valve is opened to drain process material out of the bottom of tanks or conduits, some material always remains around the seal area at the bottom of the valve. In an effort to eliminate carry-over contamination of subsequent batches, these valves must be vigorously flushed to wash material accumulating around the seals up and out through the side drain outlet from the valve body. Where it is very critical to assure that no carry-over contamination occurs, it is necessary to resort to valve disassembly and manual cleaning of the seal areas, an expensive and time-consuming procedure that, in the case of large valves, may also be a dangerous task.

Another problem that currently exists in the industry is the protracted delivery schedule for drain valves. Most tank fabricators comment that delayed delivery of tanks to end users can often be traced back to late delivery of drain valves from valve fabricators. Because of the cost, valve fabricators generally prefer to limit the amount of stock they carry. This means many of the valves need to be fabricated to order. Current one-piece sanitary drain valves cannot be shipped in parts to be welded into the tank early. Installation must wait until the valves are finished. Fabrication of a valve usually takes 8 weeks but often can take 14 weeks, even longer if there are large orders. Tanks may be finished in half the time and stand waiting for the tank bottom valve to arrive and be welded in before the tank can be pressure tested and then shipped.

In order to lessen the likelihood of carryover contamination in drain valves, to reduce maintenance costs and to simplify valve maintenance, several design improvements are proposed herein. These include:

1). A 2-part valve body 19 that allows easy access for inspection of the internal cavity 8 of the valve body 19 and for diaphragm 10 maintenance. This 2-part valve body 19 concept can clearly be seen in FIGS. 6, FIG. 13 and FIG. 14 as separate upper and lower valve body halves 27, 29 and in the full valve cross section of FIG. 15. An additional benefit of the 2-part body concept is that the upper half 27, which needs to be supplied to the tank or piping fabricators expeditiously, can be designed as a simple, relatively quick to fabricate and inexpensive to stock part which can be stocked in large numbers with minimal investment. With this design approach, the difficult, time-consuming and expensive fabrication features are combined into the lower half 29 of the valve body 19 which can be supplied at a later date directly to the end user for assembly onto the tank or conduit 2 once it is on site and ready to be installed.

2). A design of a valve body 19 where the diaphragm 10 can still be mounted up into the bottom wall 34 of the valve body 19 in the traditional manner but where the bottom wall 34 of the valve body 19 is changed from a flat configuration to being constructed with a sloped configuration to improve passive drainage of material from within the valve out through the outlet 30. This can be seen in FIGS. 1-8, particularly FIGS. 7 and 8. FIGS. 7 and 8 differ from FIGS. 6 and 9 in that they do not include an additional feature, the pedestal 18, added to the bottom wall 34. The addition of the pedestal 18 allows the diaphragms 10 and their seat in the valve body 19 to be constructed with radial symmetry. This allows the diaphragm 10 and possibly the valve body 19 to be more easily and cost-effectively manufactured without any loss of enhanced drainability. Besides the potential for savings in diaphragm 10 and valve 1 construction, the pedestal 18 design also offers the benefit in that the valve body length may be changed (lengthened, for instance, to allow for additional tank wall thickness as is necessary when it is desirable for valves to extend through a heat exchanger and insulation jackets) without the need to modify the diaphragm 10. Where a valve body 19 might need to be lengthened, for instance, in this case the pedestal 18 may simply be made proportionately longer, allowing the same diaphragm 10 to be used.

3). Valves 1 with diaphragms 10 that install through the bottom wall 34 may be constructed to be completely sloped. Consequently, such valves will passively drain without the introduction of a pedestal 18, as is depicted in FIGS. 7 and 8. This requires, however, the use of diaphragms 10 that are asymmetrical. The cost of fabricating the asymmetrical valve body 19 and an asymmetrical diaphragm 10 is higher and, although the diaphragm 10 may not last as long, it can provide improved drainability over pedestal-containing designs.

4). While valve designs that include diaphragms 10 that are inserted up through the bottom wall 34 are relatively convenient to change diaphragms, especially in smaller sizes, these valves all still include small well areas about the diaphragm 10 where it breaks through the bottom wall 34 of the valve body 19. In order to eliminate this vestigial welling area, FIGS. 1-5 include diaphragms 10 that are inserted up through the bottom wall 34 but that expand out, to a greater or lesser extent, so that this welling area is filled with diaphragm material.

5). While an overhang or abrupt curve by the diaphragm 10 where it seats on top of the pedestal 18 may produce a superior seal with the pedestal 18 and design with minimal hang-up at the seal, the overhang can result in a quiet zone where material can collect and may not be as easily cleaned. Consequently, an ideal sealing configuration between the diaphragm 10 and the pedestal 18 should expand out and be seated on top of the pedestal 18 in such a way that it covers and forms a seal with the entire upper surface of the pedestal 18 but still does not overhang the pedestal 18 or, if it does, the overhang is not abrupt but, rather is an open curve. While none of FIGS. 1-5 shows severe overhangs, FIG. 5 illustrates a good combination of positive sealing character with minimal overhang and likelihood for material entrapment that could lead to carryover contamination. Valve subassemblies with diaphragms 10 that can be inserted up through the valve bottom 34 in which the base 11 of the diaphragm 10 can be expanded out and then seated down on top of the pedestal can be constructed in many ways, including simple passive inserts or bushings that can be installed in non-interfering fashion but that can then be made to interfere (such as in the case of FIGS. 1 and 2). Active mechanical devices can also be used, such as, an expanding ring that can then form a ridged compressor and be used to create an ideal line seal around the edge of the pedestal. Many other variations would be obvious to someone knowledgeable in the art.

6). FIG. 9 illustrates a valve body 19 with an oversized outlet through the sidewall of the valve body 19. While this design may be constructed as a two-part assembly, it is illustrated here constructed in single-unit construction. The benefits to be had through this design are several, including:

Clearance: Because the actuator does not have to be removed in order to replace the diaphragm 10 and because the actuator shaft 15 may be made as a multi-part piece so that, were it necessary to remove the actuator shaft 15, the actuator shaft 15 can be slipped sideways rather than down and sideways to remove it, this valve can be mounted on tanks or conduits 2 with little clearance from the floor.

Ease of diaphragm changeout: Because the diaphragm 10 can be replaced through a side access (gained by removing a flange) to the valve internal cavity 8, the valve does not need to be removed from the vessel or conduit 2 and the actuator shaft 15 does not need to be removed from the valve body 19. As a consequence, this design offers significant advantages with regard to maintenance.

Safety: Not having to remove the valve 1 or the actuator shaft 15 to perform diaphragm 10 change-out makes maintaining the valve 1 much safer.

Time saving at initial installation: Because the valve body 19 can be fabricated as a 2-part unit with the component for attaching the valve 1 to the tank or conduit 2 being a relatively easy-to-fabricate and quick-to-supply component, this valve design has significant advantages with regard to the industry supply chain.

FIGS. 10 and 11 illustrate a way in which the diaphragm 10 can be removed and replaced without disassembly of the valve body from the actuator. By combining this arrangement with access for changeout of the diaphragm 10 through the drain outlet 30 of the valve or through another side port, diaphragms 10 can be changed out without valve disassembly from the tank or conduit 2 and without actuator shaft 15 disassembly from the valve body 19.

The use of a multi-piece actuator shaft 15 with slots and mating pins can be used to allow elements to be joined and locked together while requiring minimal vertical clearance. FIG. 11 illustrates how an upper portion of the actuator shaft (short shaft 13) can be coupled with a lower portion of the actuator shaft 15 extending up through the valve body pedestal 18.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A valve assembly, comprising:
   a valve body, said valve body including an internal cavity, an orifice in communication with the internal cavity for communicating with a process in a tank or conduit and an outlet through which process material entering the internal cavity through the orifice can be drained from the internal cavity;
   a valve actuator body including an actuating shaft, said actuating shaft including a sealing tip and being mounted for movement in the valve actuator body to seal and unseal the orifice; and
   a diaphragm, said diaphragm being mounted to the sealing tip and including a base that seals with a bottom wall of the valve body,
   wherein the bottom of the valve body has an aperture that receives the actuating shaft therethrough, said diaphragm being mountable to and removable from the bottom wall of the valve body through the aperture, and wherein a bottom of the internal cavity is sloped upwardly from a side of the internal cavity where the outlet is located to a side of the internal cavity opposite the outlet, and the base of the diaphragm forms a generally elliptical seal with the sloped bottom of the valve body.

2. The valve assembly according to claim 1, wherein the diaphragm is formed to have an asymmetric shape.

3. The valve assembly according to claim 1, wherein the bottom of the internal cavity is non-orthogonal with respect to an axis of the actuator shaft.

4. The valve assembly according to claim 1, wherein said valve body further comprises:
   a first valve body part, said first valve body part including the orifice, a first connection for attaching the first valve body part to the tank or conduit, and a second connection, said first valve body part forming an upper portion of the internal cavity; and
   a second valve body part, said second valve body part including the outlet, a third connection for attaching the second valve body part to the valve actuator body, and a fourth connection, said second valve body part forming a bottom portion of the internal cavity,
   wherein the second connection of the first valve body part and the fourth connection of the second valve body part are attachable to each other to secure the first and second valve body parts to each other.

5. The valve assembly according to claim 1, wherein the aperture has a first diameter at the bottom surface of the internal cavity of the valve body and a second diameter at a location below the bottom surface of the internal cavity, forming a radially inward extending shoulder, and the diaphragm seats below the shoulder.

6. A valve assembly, comprising:
   a valve body, said valve body including an internal cavity, an orifice in communication with the internal cavity for communicating with a process in a tank or conduit and an outlet through which process material entering the internal cavity through the orifice can be drained from the internal cavity;
   a valve actuator body including an actuating shaft, said actuating shaft including a sealing tip and being mounted for movement in the valve actuator body to seal and unseal the orifice; and
   a diaphragm, said diaphragm being mounted to the sealing tip and including a base that seals with a bottom of the valve body,
   wherein the base of the diaphragm is removable from the bottom of the valve body without removing the valve actuator body or the actuation shaft from the valve body, and wherein a bottom of the internal cavity is sloped upwardly from a side of the internal cavity where the outlet is located to a side of the internal cavity opposite the outlet, and the base of the diaphragm forms a generally elliptical seal with the sloped bottom of the valve body.

7. The valve assembly according to claim 6, wherein the diaphragm is formed to have an asymmetric shape.

8. The valve assembly according to claim 6, wherein said valve body further comprises:
   a first valve body part, said first valve body part including the orifice, a first connection for attaching the first valve body part to the tank or conduit, and a second connection, said first valve body part forming an upper portion of the internal cavity; and
   a second valve body part, said second valve body part including the outlet, a third connection for attaching the second valve body part to the valve actuator body, and a fourth connection, said second valve body part forming a bottom portion of the internal cavity and.
   wherein the second connection of the first valve body part and the fourth connection of the second valve body part are attachable to each other to secure the first and second valve body parts to each other, and the diaphragm is removable from the internal cavity by detaching the first and second valve body parts from each other.

* * * * *